United States Patent
White et al.

(10) Patent No.: US 7,287,102 B1
(45) Date of Patent: Oct. 23, 2007

(54) SYSTEM AND METHOD FOR CONCATENATING DATA

(75) Inventors: Theodore C. White, Rancho Santa Margarita, CA (US); William W. Dennin, Mission Viejo, CA (US); Angel G. Perozo, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 278 days.

(21) Appl. No.: 10/761,786

(22) Filed: Jan. 21, 2004

Related U.S. Application Data

(60) Provisional application No. 60/444,339, filed on Jan. 31, 2003.

(51) Int. Cl.
G06F 13/00 (2006.01)
G06F 3/00 (2006.01)
G06F 12/00 (2006.01)

(52) U.S. Cl. ............... 710/34; 710/3; 710/4; 710/52; 710/54

(58) Field of Classification Search .......... 710/3, 710/4, 34, 52, 54, 65
See application file for complete search history.

(56) References Cited

U.S. PATENT DOCUMENTS

| | | | |
|---|---|---|---|
| 3,800,281 A | 3/1974 | Devore et al. | |
| 3,988,716 A | 10/1976 | Fletcher et al. | |
| 4,001,883 A | 1/1977 | Strout et al. | |
| 4,016,368 A | 4/1977 | Apple, Jr. | |
| 4,050,097 A | 9/1977 | Miu et al. | |
| 4,080,649 A | 3/1978 | Calle et al. | |
| 4,156,867 A | 5/1979 | Bench et al. | |
| 4,225,960 A | 9/1980 | Masters | |
| 4,275,457 A | 6/1981 | Leighou et al. | |
| 4,390,969 A | 6/1983 | Hayes | |
| 4,451,898 A | 5/1984 | Palermo et al. | |
| 4,486,750 A | 12/1984 | Aoki | |
| 4,500,926 A | 2/1985 | Yoshimaru et al. | |
| 4,587,609 A | 5/1986 | Boudreau et al. | |
| 4,603,382 A | 7/1986 | Cole | |

(Continued)

FOREIGN PATENT DOCUMENTS

EP 0528273 2/1993

(Continued)

OTHER PUBLICATIONS

PCT International Search Report, Doc. No. PCT/US00/15084, Dated Nov. 15, 2000, 2 pages.

(Continued)

*Primary Examiner*—Kim Huynh
*Assistant Examiner*—Scott Sun

(57) ABSTRACT

A storage controller includes a first memory that stores a plurality of data blocks that include first and second non-contiguous data segments. A queue module stores data lengths and data start addresses of the first and second data segments. A read assembly module communicates with the first memory and the queue module, receives a request to read the first and second data segments from a host, reads the plurality of data blocks from the first memory, extracts the first and second data segments from the read plurality of data blocks based on the data lengths and data start addresses after the plurality of data blocks is read from the first memory, and transfers the first and second data segments contiguously to the host.

28 Claims, 7 Drawing Sheets

U.S. PATENT DOCUMENTS

| | | | |
|---|---|---|---|
| 4,625,321 A | 11/1986 | Pechar et al. | |
| 4,667,286 A | 5/1987 | Young et al. | |
| 4,777,635 A | 10/1988 | Glover | |
| 4,805,046 A | 2/1989 | Kuroki et al. | |
| 4,807,116 A | 2/1989 | Katzman et al. | |
| 4,807,253 A | 2/1989 | Hagenauer et al. | |
| 4,809,091 A | 2/1989 | Miyazawa et al. | |
| 4,811,282 A | 3/1989 | Masina | |
| 4,812,769 A | 3/1989 | Agoston | |
| 4,860,333 A | 8/1989 | Bitzinger et al. | |
| 4,866,606 A | 9/1989 | Kopetz | |
| 4,881,232 A | 11/1989 | Sako et al. | |
| 4,920,535 A | 4/1990 | Watanabe et al. | |
| 4,949,342 A | 8/1990 | Shimbo et al. | |
| 4,970,418 A | 11/1990 | Masterson | |
| 4,972,417 A | 11/1990 | Sako et al. | |
| 4,975,915 A | 12/1990 | Sako et al. | |
| 4,989,190 A | 1/1991 | Kuroe et al. | |
| 5,014,186 A | 5/1991 | Chisholm | |
| 5,023,612 A | 6/1991 | Liu | |
| 5,027,357 A | 6/1991 | Yu et al. | |
| 5,050,013 A | 9/1991 | Holsinger | |
| 5,051,998 A | 9/1991 | Murai et al. | |
| 5,068,755 A | 11/1991 | Hamilton et al. | |
| 5,068,857 A | 11/1991 | Yoshida | |
| 5,072,420 A | 12/1991 | Conley et al. | |
| 5,088,093 A | 2/1992 | Storch et al. | |
| 5,109,500 A | 4/1992 | Iseki et al. | |
| 5,117,442 A | 5/1992 | Hall | |
| 5,127,098 A | 6/1992 | Rosenthal et al. | |
| 5,133,062 A | 7/1992 | Joshi et al. | |
| 5,136,592 A | 8/1992 | Weng | |
| 5,146,585 A | 9/1992 | Smith, III | |
| 5,157,669 A | 10/1992 | Yu et al. | |
| 5,162,954 A | 11/1992 | Miller et al. | |
| 5,193,197 A | 3/1993 | Thacker | |
| 5,204,859 A | 4/1993 | Paesler et al. | |
| 5,218,564 A | 6/1993 | Haines et al. | |
| 5,220,569 A | 6/1993 | Hartness | |
| 5,237,593 A | 8/1993 | Fisher et al. | |
| 5,243,471 A | 9/1993 | Shinn | |
| 5,249,271 A | 9/1993 | Hopkinson | |
| 5,257,143 A | 10/1993 | Zangenehpour | |
| 5,261,081 A | 11/1993 | White et al. | |
| 5,271,018 A | 12/1993 | Chan | |
| 5,274,509 A | 12/1993 | Buch | |
| 5,276,564 A | 1/1994 | Hessing et al. | |
| 5,276,662 A | 1/1994 | Shaver, Jr. et al. | |
| 5,276,807 A | 1/1994 | Kodama et al. | |
| 5,280,488 A | 1/1994 | Glover et al. | |
| 5,285,327 A | 2/1994 | Hetzler | |
| 5,285,451 A | 2/1994 | Henson et al. | |
| 5,301,333 A | 4/1994 | Lee | |
| 5,307,216 A | 4/1994 | Cook et al. | |
| 5,315,708 A | 5/1994 | Eidler et al. | |
| 5,339,443 A | 8/1994 | Lockwood | |
| 5,361,266 A | 11/1994 | Kodama et al. | |
| 5,361,267 A | 11/1994 | Godiwala et al. | |
| 5,408,644 A | 4/1995 | Schneider et al. | |
| 5,420,984 A | 5/1995 | Good et al. | |
| 5,428,627 A | 6/1995 | Gupta | |
| 5,440,751 A | 8/1995 | Santeler et al. | |
| 5,465,343 A | 11/1995 | Henson et al. | |
| 5,473,761 A * | 12/1995 | Parks et al. .................. 711/4 | |
| 5,487,170 A | 1/1996 | Bass et al. | |
| 5,488,688 A | 1/1996 | Gonzales et al. | |
| 5,491,701 A | 2/1996 | Zook | |
| 5,500,848 A | 3/1996 | Best et al. | |
| 5,506,989 A | 4/1996 | Boldt et al. | |
| 5,507,005 A | 4/1996 | Kojima et al. | |
| 5,519,837 A | 5/1996 | Tran | |
| 5,523,903 A | 6/1996 | Hetzler et al. | |
| 5,544,180 A | 8/1996 | Gupta | |
| 5,544,346 A | 8/1996 | Amini et al. | |
| 5,546,545 A | 8/1996 | Rich | |
| 5,546,548 A | 8/1996 | Chen et al. | |
| 5,563,896 A | 10/1996 | Nakaguchi | |
| 5,572,148 A | 11/1996 | Lytle et al. | |
| 5,574,867 A | 11/1996 | Khaira | |
| 5,581,715 A | 12/1996 | Verinsky et al. | |
| 5,583,999 A | 12/1996 | Sato et al. | |
| 5,592,404 A | 1/1997 | Zook | |
| 5,600,662 A | 2/1997 | Zook et al. | |
| 5,602,857 A | 2/1997 | Zook et al. | |
| 5,615,190 A | 3/1997 | Best et al. | |
| 5,623,672 A | 4/1997 | Popat | |
| 5,623,692 A * | 4/1997 | Priem et al. .................. 710/3 |
| 5,626,949 A | 5/1997 | Blauer et al. | |
| 5,627,695 A | 5/1997 | Prins et al. | |
| 5,640,602 A | 6/1997 | Takase | |
| 5,649,230 A | 7/1997 | Lentz | |
| 5,664,121 A | 9/1997 | Cerauskis | |
| 5,689,656 A | 11/1997 | Baden et al. | |
| 5,691,994 A | 11/1997 | Acosta et al. | |
| 5,692,135 A | 11/1997 | Alvarez, II et al. | |
| 5,692,165 A | 11/1997 | Jeddeloh et al. | |
| 5,719,516 A | 2/1998 | Sharpe-Geisler | |
| 5,729,718 A | 3/1998 | Au | |
| 5,740,406 A * | 4/1998 | Rosenthal et al. .......... 711/169 |
| 5,740,466 A | 4/1998 | Geldman | |
| 5,745,793 A | 4/1998 | Atsatt et al. | |
| 5,754,759 A | 5/1998 | Clarke et al. | |
| 5,758,188 A | 5/1998 | Appelbaum et al. | |
| 5,784,569 A | 7/1998 | Miller et al. | |
| 5,794,073 A | 8/1998 | Ramakrishnan et al. | |
| 5,801,998 A | 9/1998 | Choi | |
| 5,818,886 A | 10/1998 | Castle | |
| 5,822,142 A | 10/1998 | Hicken | |
| 5,831,922 A | 11/1998 | Choi | |
| 5,835,930 A | 11/1998 | Dobbek | |
| 5,841,722 A | 11/1998 | Willenz | |
| 5,844,844 A | 12/1998 | Bauer et al. | |
| 5,850,422 A | 12/1998 | Chen | |
| 5,854,918 A | 12/1998 | Baxter | |
| 5,890,207 A | 3/1999 | Sne et al. | |
| 5,890,210 A | 3/1999 | Ishii et al. | |
| 5,907,717 A | 5/1999 | Ellis | |
| 5,912,906 A | 6/1999 | Wu et al. | |
| 5,925,135 A | 7/1999 | Trieu et al. | |
| 5,937,435 A | 8/1999 | Dobbek et al. | |
| 5,950,223 A | 9/1999 | Chiang et al. | |
| 5,968,180 A | 10/1999 | Baco | |
| 5,983,293 A | 11/1999 | Murakami | |
| 5,991,911 A | 11/1999 | Zook | |
| 6,029,226 A | 2/2000 | Ellis et al. | |
| 6,029,250 A | 2/2000 | Keeth | |
| 6,041,417 A | 3/2000 | Hammond et al. | |
| 6,065,053 A | 5/2000 | Nouri et al. | |
| 6,067,206 A | 5/2000 | Hull et al. | |
| 6,070,200 A | 5/2000 | Gates et al. | |
| 6,078,447 A | 6/2000 | Sim | |
| 6,081,849 A | 6/2000 | Born et al. | |
| 6,092,231 A | 7/2000 | Sze | |
| 6,094,320 A | 7/2000 | Ahn | |
| 6,124,994 A | 9/2000 | Malone, Sr. | |
| 6,134,063 A | 10/2000 | Weston-Lewis et al. | |
| 6,157,984 A | 12/2000 | Fisher | |
| 6,178,486 B1 | 1/2001 | Gill et al. | |
| 6,185,207 B1 * | 2/2001 | LaBerge et al. ............ 370/392 |
| 6,192,499 B1 | 2/2001 | Yang | |
| 6,201,655 B1 | 3/2001 | Watanabe et al. | |
| 6,223,303 B1 | 4/2001 | Billings et al. | |
| 6,279,089 B1 | 8/2001 | Schibilla et al. | |
| 6,297,926 B1 | 10/2001 | Ahn | |

| | | |
|---|---|---|
| 6,330,626 B1 | 12/2001 | Dennin et al. |
| 6,381,659 B2 | 4/2002 | Proch et al. |
| 6,401,149 B1 | 6/2002 | Dennin et al. |
| 6,470,461 B1 | 10/2002 | Pinvidic et al. |
| 6,487,631 B2 | 11/2002 | Dickinson et al. |
| 6,490,635 B1 | 12/2002 | Holmes |
| 6,530,000 B1 | 3/2003 | Krantz et al. |
| 6,574,676 B1 | 6/2003 | Megiddo |
| 6,662,334 B1 | 12/2003 | Stenfort |
| 6,816,921 B2 * | 11/2004 | Jahnke et al. ............... 710/22 |
| 6,826,650 B1 | 11/2004 | Krantz et al. |
| 2001/0044873 A1 | 11/2001 | Wilson et al. |
| 2001/0054121 A1 * | 12/2001 | Proch et al. ............... 710/57 |
| 2002/0176301 A1 * | 11/2002 | Kim ............... 365/222 |
| 2003/0037225 A1 | 2/2003 | Deng et al. |
| 2003/0059118 A1 * | 3/2003 | Suzuki ............... 382/233 |
| 2003/0097525 A1 * | 5/2003 | Aruga ............... 711/114 |
| 2003/0120797 A1 * | 6/2003 | Brodeur et al. ............... 709/236 |
| 2003/0172325 A1 * | 9/2003 | Wyatt et al. ............... 714/53 |
| 2003/0177435 A1 * | 9/2003 | Budd et al. ............... 714/776 |
| 2004/0004964 A1 * | 1/2004 | Lakshmanamurthy et al. ... 370/394 |
| 2004/0260866 A1 * | 12/2004 | Davis ............... 711/108 |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for faster access", System Design ASIC & EDA, pp. 24-34 (Nov. 1993).

P.M. Bland et. al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

PCT Search Report for PCT/US01/22404, mailed Jan. 29, 2003, 4 Pages.

* cited by examiner

SYSTEM AND METHOD FOR CONCATENATING DATA

CROSS REFERENCE TO RELATED APPLICATIONS

This patent application is related to and claims priority to U.S. provisional patent application Ser. No. 60/444,339, Filed on Jan. 31, 2003, entitled "System and Method for Coalescing Data", the disclosure of which is incorporated herein by reference in its entirety.

BACKGROUND OF THE INVENTION

1. Field of the Invention

The present invention relates generally to storage device controllers, and more particularly, to streamlining data flow in storage device controllers.

2. Background

Conventional computer systems typically include several functional components. These components may include a central processing unit (CPU), main memory, input/output ("I/O") devices, and streaming storage devices (for example, tape drives) (referred to herein as "storage device"). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage devices to the host system. Communications between the host system and the controller is usually provided using one of a variety of standard I/O bus interfaces.

Typically, when data is read from a storage device, a host system sends a read command to the controller, which stores the read command into the buffer memory. Data is read from the device and stored in the buffer memory.

In storage devices, data is stored in blocks of varying sizes and non-contiguous segments. However, data, when sent to the host system must be contiguous. Therefore, data, after being read should be assembled efficiently, so that, to a host system it appears contiguous. Conventional systems do not perform this function efficiently.

Therefore, there is a need for a system to assemble data so that when it is sent to the host it is contiguous.

SUMMARY OF THE INVENTION

In one aspect of the present invention, a read assembly module in a storage controller for concatenating data segments is provided. The read assembly module includes, a first register for receiving data segments and a data start address; and a second register for concatenating data segments having different data segment size.

The read assembly module also includes a third register that holds data before it is sent to the second register; and a fourth register for padding data segments, if padding is needed.

In yet another aspect of the present invention, a system for concatenating data segments before the data segments are sent to a requesting host system is provided. The system includes, a read assembly module; a read command queue, which provides information to the read assembly module; and a controller that controls the read command queue.

In yet another aspect of the present invention, a method for concatenating data segments before the data segments are sent to a requesting host system is provided. The method includes, receiving data start address; and assembling data segments such that the segments appear contiguous.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a controller will initially be described. The specific architecture and operation of the preferred embodiment will then be described with reference to the general architecture.

Figure 1A:
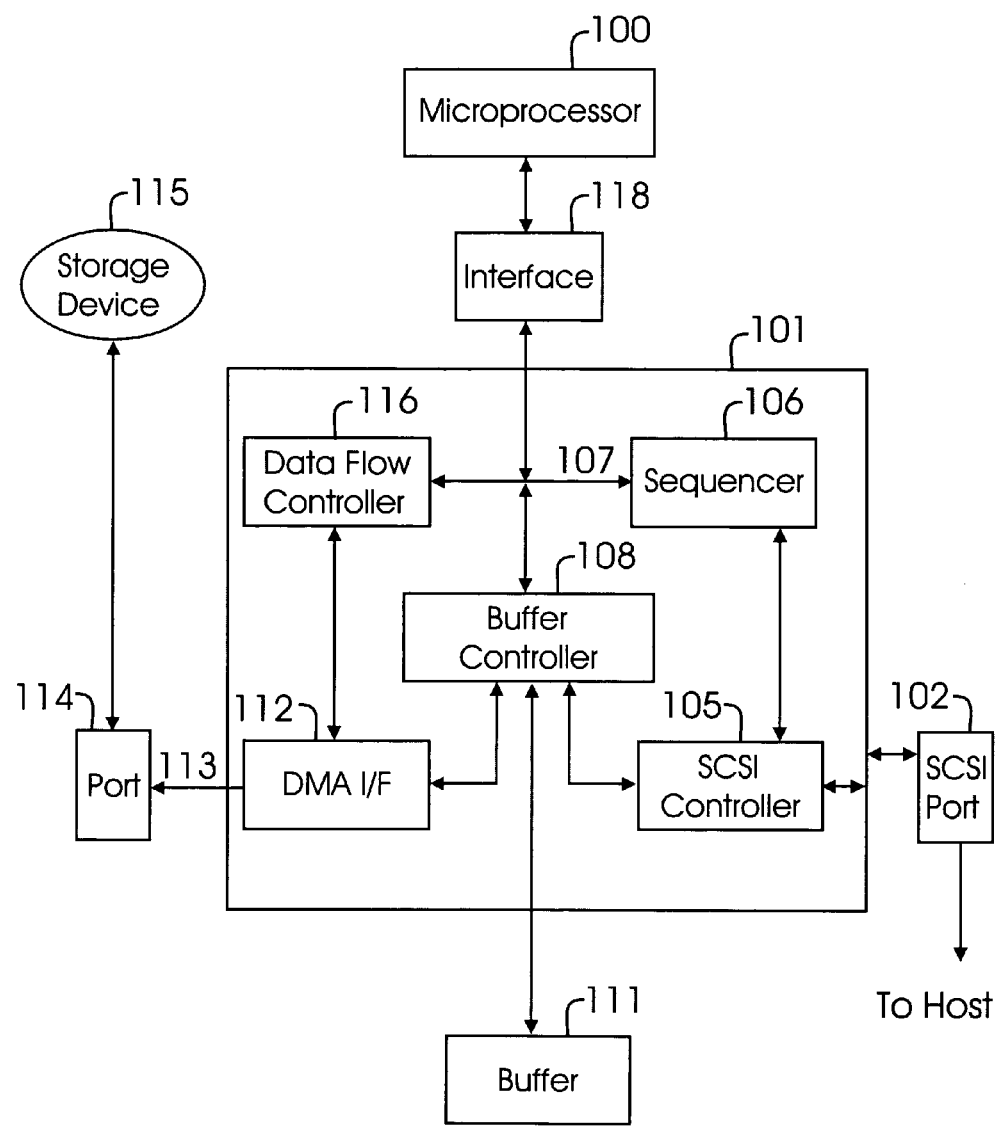
FIG. 1A shows a block diagram of a controller, according to one aspect of the present invention.

The system of FIG. 1A is an example of a streaming storage drive system (e.g., tape drive), included in (or coupled to) a computer system. The host computer (not shown) and the storage device 115 communicate via port 102, which is connected to a data bus (not shown). In an alternate embodiment (not shown), the storage device 115 is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to SCSI port 102, port 114, buffer memory 111 and microprocessor 100. Interface 118 serves to couple microprocessor bus 107 to microprocessor 100. A read only memory ("ROM") omitted from the drawing is used to store firmware code executed by microprocessor 100. Port 114 couples controller 101 to device 115.

Controller 101 can be an integrated circuit (IC) that comprises of various functional modules, which provide for the writing and reading of data stored on storage device 115. Microprocessor 100 is coupled to controller 101 via interface 118 to facilitate transfer of data, address, timing and control information. Buffer memory 111 is coupled to controller 101 via ports to facilitate transfer of data, timing and address information.

Data flow controller 116 is connected to microprocessor bus 107 and to buffer controller 108. A DMA interface 112 is connected to microprocessor bus 107 and to data and control port 113.

SCSI controller 105 includes programmable registers and state machine sequencers that interface with SCSI port 102 on one side and to a fast, buffered direct memory access (DMA) channel on the other side.

Sequencer 106 supports customized SCSI sequences, for example, by means of a 256-location instruction memory that enables users to customize command automation features. Sequencer 106 is organized in accordance with the Harvard architecture, which has separate instruction and data memories. Sequencer 106 includes, for example, a 32-byte register file, a multi-level deep stack, an integer algorithmic logic unit (ALU) and other special purpose modules. Sequencer 106 supports firmware and hardware interrupts schemes. The firmware interrupt enables microprocessor 100 to initiate an operation within Sequencer 106 without stopping sequencer operation. Hardware interrupt comes directly from SCSI controller 105.

Buffer controller (also referred to as "BC") 108 connects buffer memory 111, DMA I/F 112, a SCSI channel of SCSI controller 105 and to bus 107. Buffer controller 108 regulates data movement into and out of buffer memory 111.

To read data from device 115, a host system sends a read command to controller 101, which stores the read commands in buffer memory 111. Microprocessor 100 then reads the command out of buffer memory 111 and initializes the various functional blocks of controller 101. Data is read from device 115 and is passed through DMA I/F 112 to buffer controller 108.

Figure 1B:
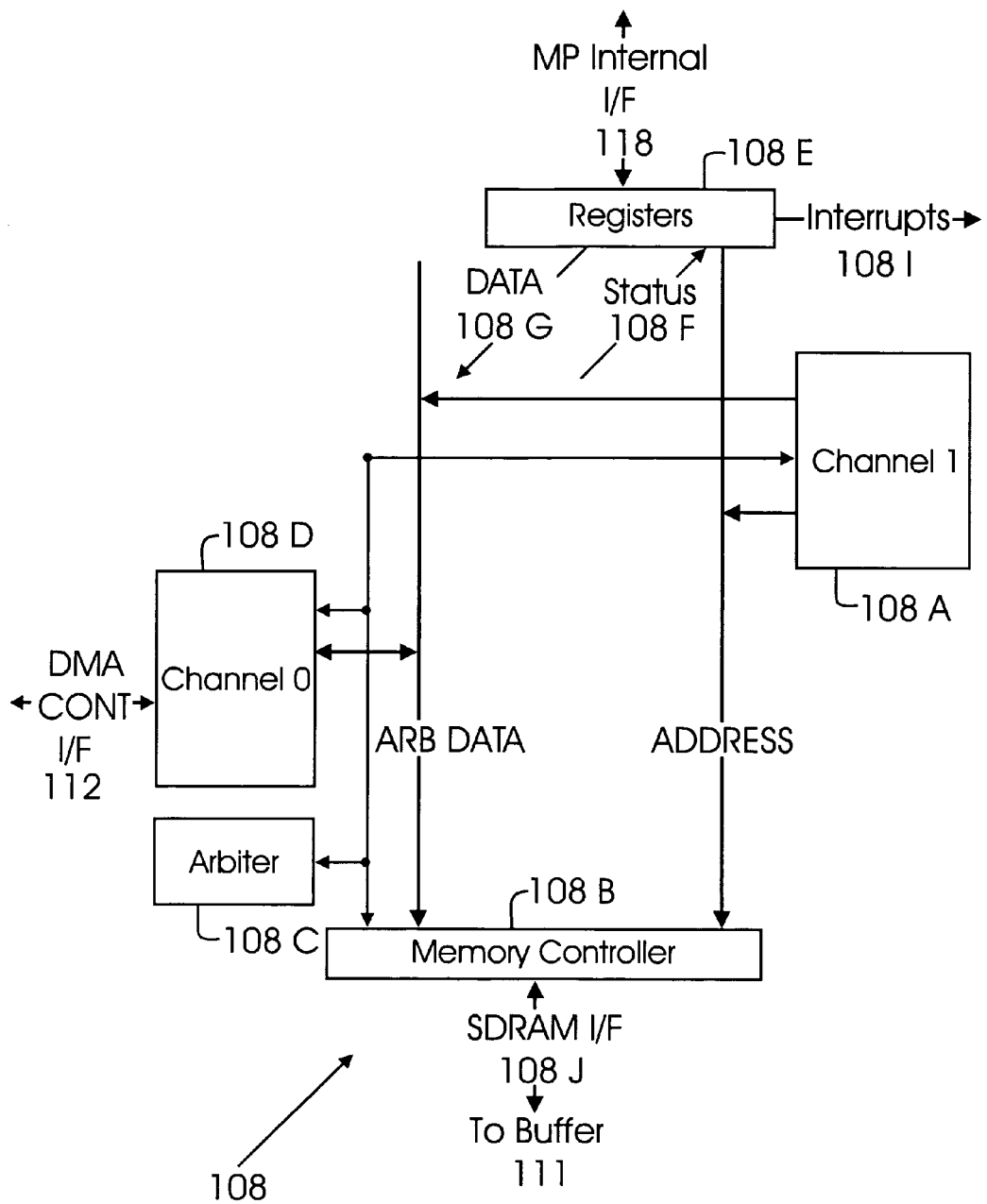
FIG. 1B is a block diagram of a buffer controller, according to one aspect of the present invention.

FIG. 1B shows a block diagram of BC 108 with Channel 1 108A and Channel 0 108D interfaces for moving data to and from buffer 111. BC 108 includes register(s) 108E and an Arbiter 108C. Arbiter 108C arbitrates between plural channels in BC 108, for example, Channel 0 108D and Channel 1 108A. Register 108E is coupled to interface 118 via bus 107 that allows microprocessor 100 and BC 108 to communicate. Data 108G and status 108F is moved in and out of register 108E.

BC 108 also includes a memory controller 108B that interfaces with buffer 111 through a synchronous dynamic random access memory ("SDRAM") or dynamic random access memory ("DRAM") interface 108J.

Figure 4:
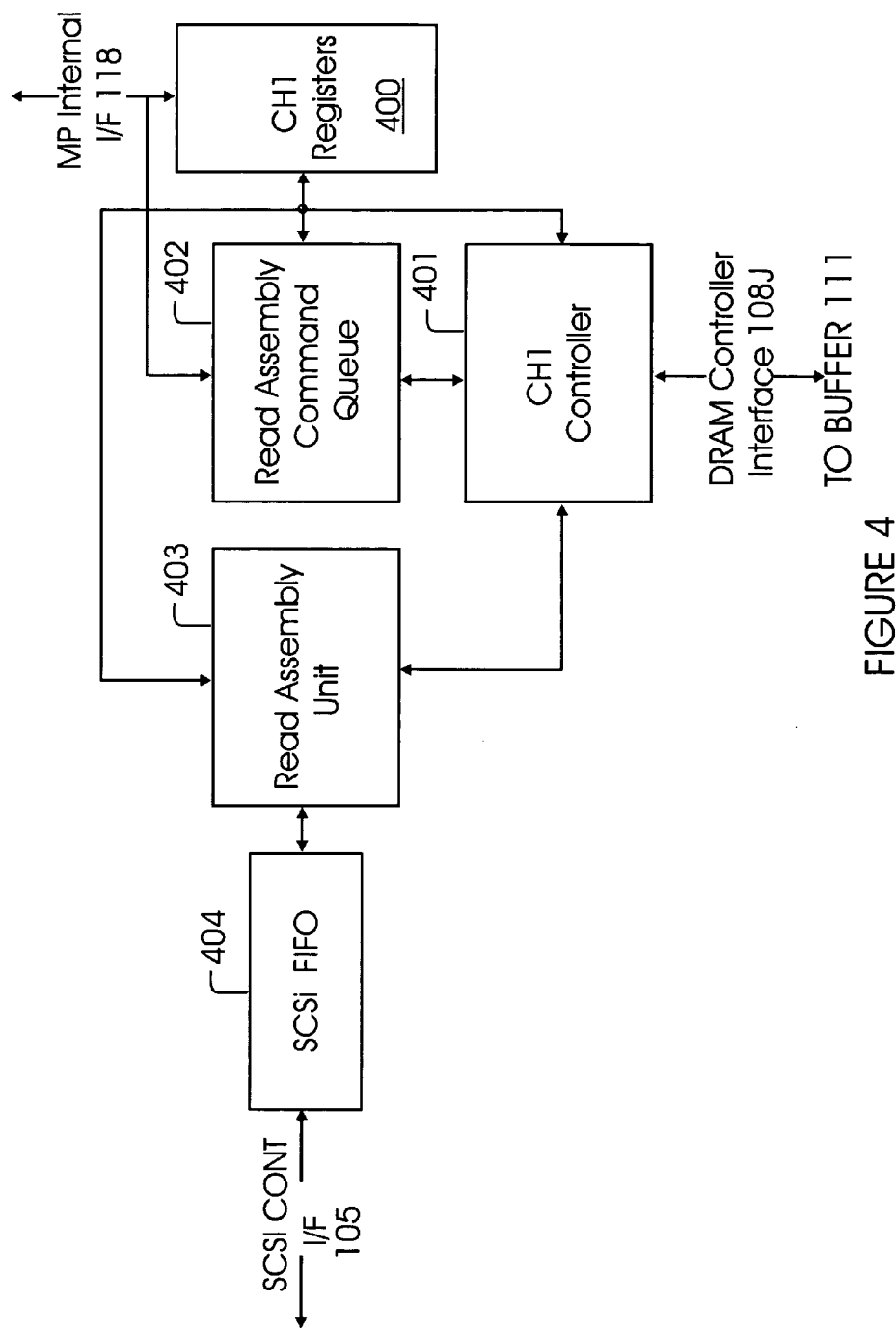
FIG. 4 shows a block diagram of a Channel interface used by the buffer controller of FIG. 1B and uses the read assembly unit of FIG. 3, according to one aspect of the present invention.

FIG. 4 shows a block diagram, of Channel 1 108A interface, which includes read assembly unit 403 and read assembly command queue 402 (may also be referred to as "scatter gather module 402") that are described below, according to one aspect of the present invention.

Channel 1 108A also includes a first-in first-out memory buffer ("FIFO") 404 that receives data from SCSI interface 105. Channel 1 108A also has plural registers 400 that are operationally coupled to a controller 401 that is coupled to a buffer memory 111 via interface 108J. Controller 401 includes a state machine 501 (FIG. 5) that monitors/controls queue 402, as described below.

Figure 3:
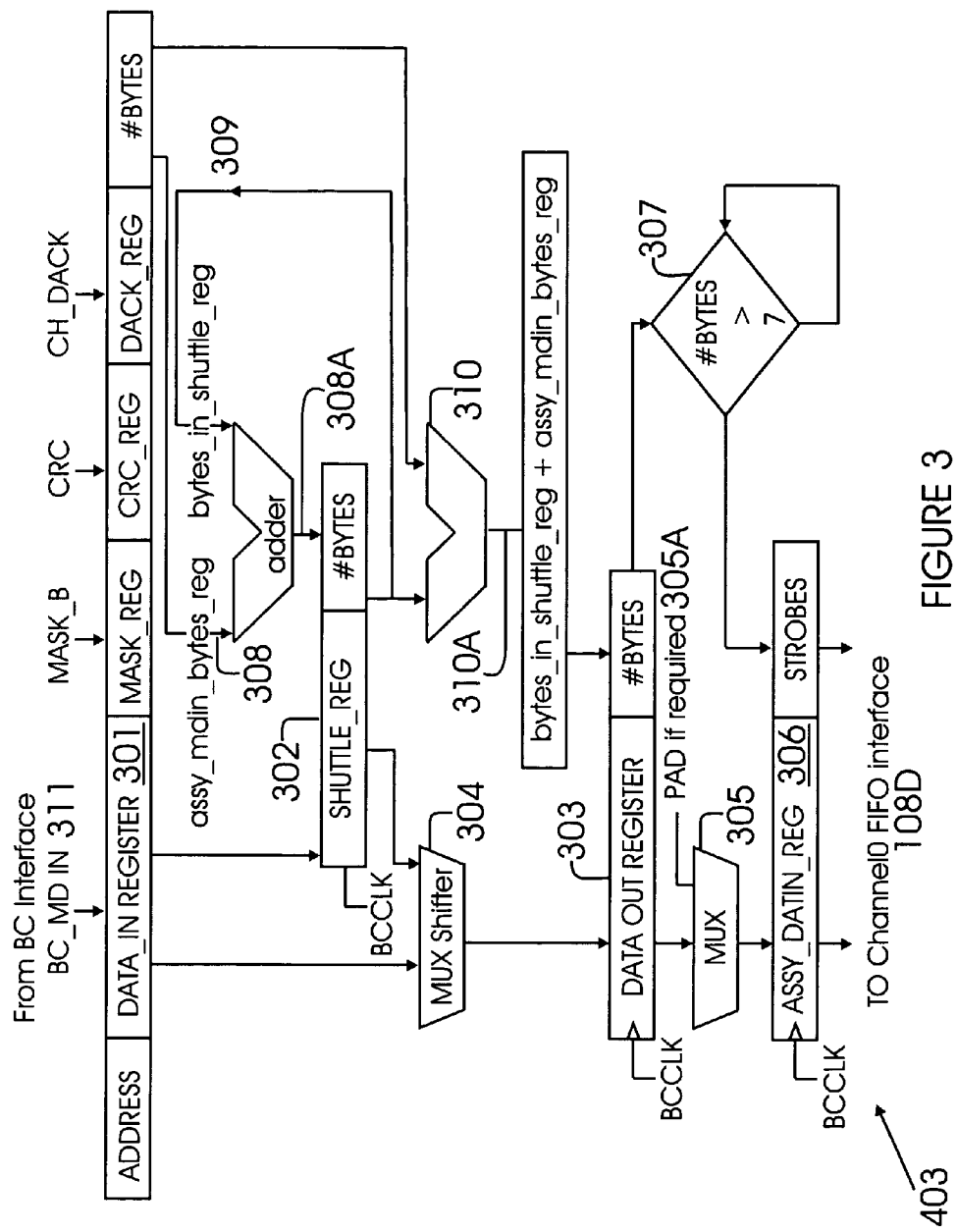
FIG. 3 is a block diagram of a read assembly unit, according to one aspect of the present invention.

Read Assembly Module:

FIG. 3 shows a block diagram of read assembly unit 403 in BC 108, according to one aspect of the present invention. Read assembly operations in controller 101 use the read assembly module 403 and the Scatter-Gather module 402 to concatenate data segments to be written into channel 1 108A FIFO 404. Each data segment is defined by a scatter-gather entry for length and location (data start address) within external buffer memory 111 with the start address of the data block. As the data blocks containing the data segments are read, module 403 extracts the data segments and writes them into Channel 1 108A FIFO 404. Entire data blocks are read to verify data integrity by using the CRC (cyclic redundancy code). The data segments then appear contiguous to a host that had a read request and can include multiple data blocks. Also, multiple blocks are pieced together without loosing any data integrity because data length can span multiple blocks and when data length crosses over CRC, the CRC is not transferred to FIFO 404.

Figure 5:
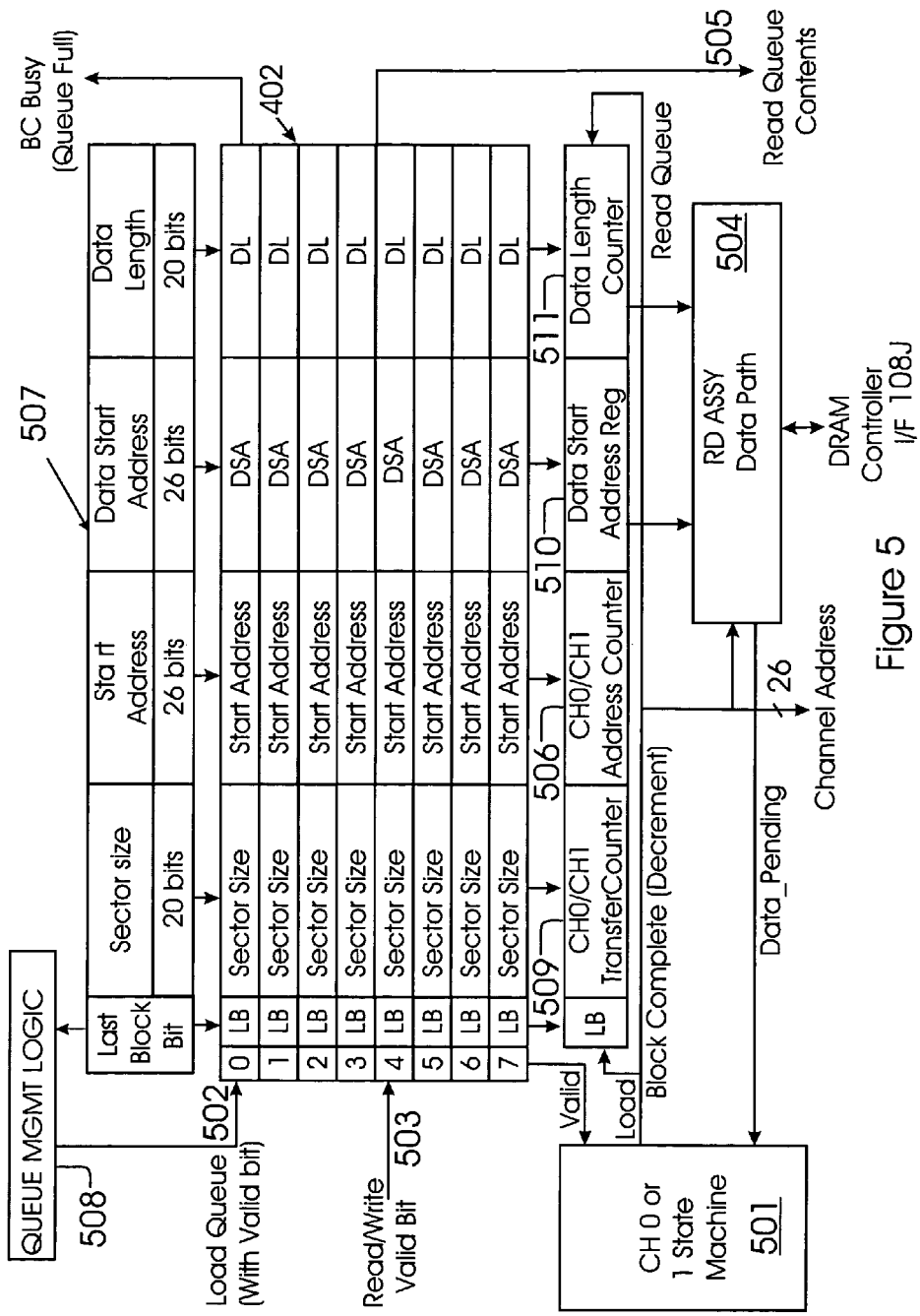
FIG. 5 is a block diagram of a read assembly command queue (Scatter Gather Module) interfacing with various other components, according to one aspect of the present invention.

In one embodiment of the present invention, read assembly module (or unit) 403 (may also be referred to as module 403 or unit 403) is a pipelined design. Buffer controller 108 control signals, address, data and masks are registered in register 301 of read assembly module 403. Data collection starts when a cycle includes the byte address contained in a data start address register 510 (FIG. 5).

Register 301 receives address from register 510, data 311, mask, cyclic redundancy code ("CRC") and data acknowledgement (DACK_REG). The address denotes the location from where data is to be read.

A "shuttle" register 302 is used to hold data temporarily for later assembly in register 303. Although shuttle register 302 may be of any size, in one aspect of the present invention, it may be 7 bytes wide. Shuttle register 302 receives data from register 301.

"Data-Out" (or output) register 303 collects data from shuttle register 302 and register 301 via multiplexer ("Mux") shifter 304 for assembly. Mux shifter 304 selects the valid byte(s) from registers 301 and 302.

In one aspect, register 303 collects an 8-byte word. Channel 1 FIFO 404 may be written 8 bytes at a time, except for the last write, which may only be 4 bytes. A segment can be of any byte length supported by the Data Length counter/register (511, FIG. 5), so it is possible to end up with a non-MOD4 residue in shuttle register 302.

A force transfer signal (FORCE_XFR) is used to push non-MOD4 residues into the FIFO 404. The non-MOD4 residue is padded (305A) to the nearest MOD4 boundary before it is written into the FIFO 404 via register 306. The padding 305A occurs in register 306.

Read assembly unit 403 also includes logic for two adders, 308 and 310. Logic 308 receives the number of new bytes from register 301 and the number of valid bytes 309 from register 302. Output 308A of logic 308 is sent to register 302.

Logic 310 receives the number of new bytes from register 301 and the number of valid bytes from register 302. Output 310A of logic 310 is sent to register 303.

Read Assembly Operations:

Read assembly operations concatenate data segments and write them into FIFO 404. Data segments reside in buffer 111 and are defined using a data length register/counter 511 and a data start address register 510. The data length register 511 contains the segment length in bytes. The data start address register 510 contains the byte address from where the segment begins. The data start address can be loaded with any byte address within the BC 108-address space into register 301.

Read assembly module 403 sends to FIFO 404 the selected data segment, but the entire block where the segment resides is read so that CRC can confirm data integrity. CRC bytes are not written into FIFO 404 nor accounted for in data length counter 511. In one aspect of the present invention, channel 1 108A operations are in double-word multiples, and the read-tape-assembly module 403 may pad (305A) the last word written into FIFO 404.

Multiple segments are concatenated using the scatter-gather queue 402. Each scatter-gather entry includes all data required to define a segment.

FIG. 5 shows a block diagram showing read command queue 402 interaction with various components, according to one aspect of the present invention. Read command queue 402 may have any number of queues. FIG. 5 illustrates only 8 queues (0-7). Each queue, for example queue 0, has various entries, collectively shown as 507, which includes, last block bit, sector size, the start address for a sector, the start address for the data and the data length.

Queue management logic 508 controls queue entries and loads queue 402 using a valid bit 502. Queue 402 is functionally coupled to a transfer counter 509, address counter 506, data start address register 510 and data length counter 511.

Transfer counter 509 counts the number of sectors that have been transferred. Address counter 506 maintains a count for buffer 111 addresses.

Data start address register 510 provides the address of the data to register 301 in read assembly unit 403 (shown as read assembly data path 504 in FIG. 5). Data length counter 511 maintains the count of data that is moved, which terminates the operation after the last block.

Output 505 is used for diagnostic purposes and is sent to register 400. State machine 501 (in controller 401) interfaces with read assembly path 504 and queue 402.

Figure 6:
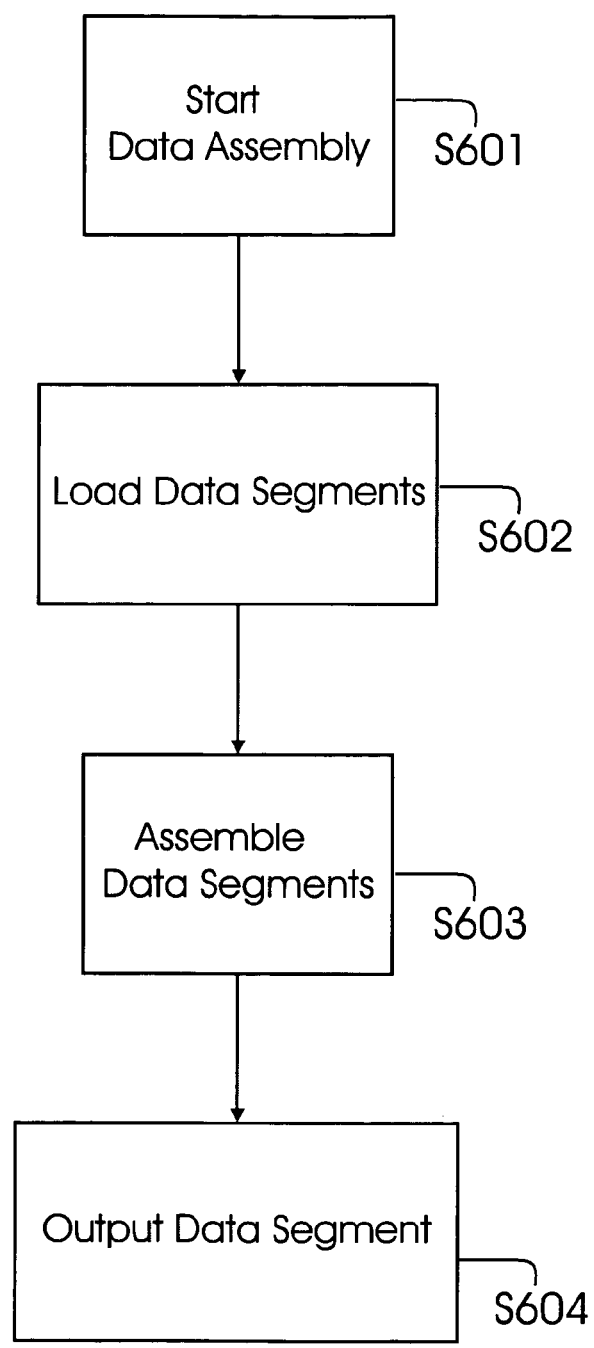
FIG. 6 illustrates steps of a process for concatenating data segments according to one aspect of the present invention.

FIG. 6 shows a process flow diagram for concatenating data segments so that the data segments appear contiguous. The process starts in step S601. Register 301 receives data start address from register 510. In step S602, data segments are loaded in register 301.

In step S603, data assembly takes place in register 303 that receives the number of bytes from register 301 and valid bytes from shuttle register 302. If any padding 305A is required, then it is done in register 306.

Thereafter, in step S604, data concatenated data segments are moved into FIFO 404. The process stops based on the value of data length counter 511.

Figure 2:
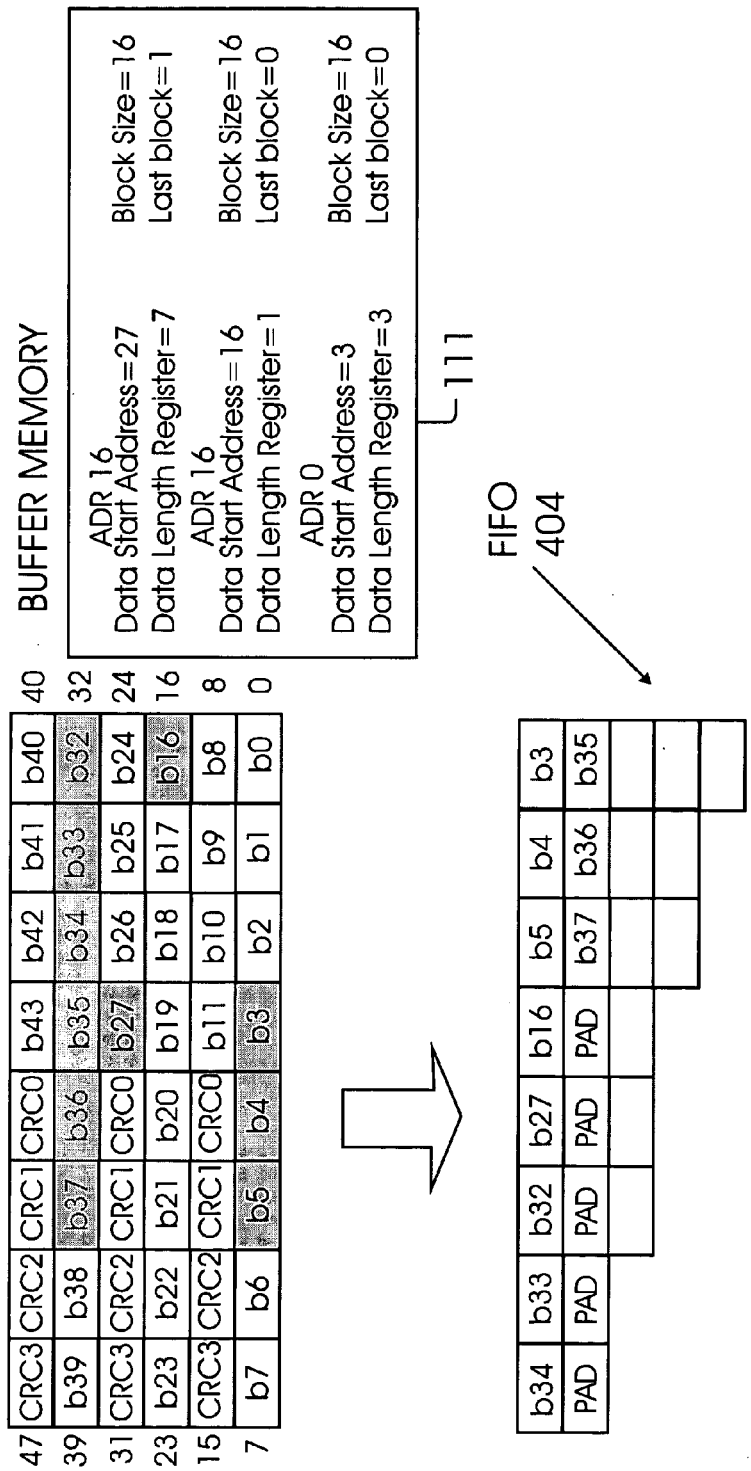
FIG. 2 shows examples of using the read assembly unit, according to one aspect of the present invention.

FIG. 2 shows an example of how data is concatenated, using the foregoing adaptive aspects of the present invention. It is noteworthy that the example in FIG. 2 is not intended to limit the invention, but is only to provide an example.

FIG. 2 shows three data segments in buffer 111. Data block address is shown as 0, 8, 16, 24, 32 and 40 on one side and 7, 15, 23, 31, 39 and 47 on another side. Multiple data blocks can be read and concatenated, while maintaining data integrity. Hence, if a large block of data has to be transferred, for example 10 MB, the data is broken in to chunks, for example, 512 bytes with 4 bytes of CRC. These blocks are then stored and read in segments, according to one aspect of the present invention.

The first data segment has a data block address of 0, data start address of 3, length 3 bytes and block size 16. This segment is copied into FIFO 404. The second data segment has a length of 1 byte, a start address 16 and data block address of 16. The third segment also has a data block address of 16, length of 7 bytes, and data start address of 27. All this information is sent to register 301.

All three data segments are concatenated and written into FIFO 404 so that they appear contiguous to a requesting host system (not shown). Also, FIFO 404 may have three (3) pad bytes because the total length (addition of the three segments) was not mod4 and the last segment goes across a block boundary operation. It is noteworthy that the CRC is not transferred to FIFO 404. As shown in FIG. 2, multiple blocks of data from buffer memory 111 are concatenated together, while data integrity is maintained.

In one aspect of the present invention, data fragments are efficiently concatenated.

Although the present invention has been described with reference to specific embodiments, these embodiments are illustrative only and not limiting. Many other applications and embodiments of the present invention will be apparent in light of this disclosure.

What is claimed is:

1. A storage controller, comprising:
   a first memory that stores a plurality of data blocks that include first and second noncontiguous data segments;
   a queue module that stores data lengths and data start addresses of the first and second data segments; and
   a read assembly module that communicates with the first memory and the queue module, that receives a request to read the first and second data segments from a host, that reads the plurality of data blocks from the first memory, that extracts the first and second data segments from the read plurality of data blocks based on the data lengths and data start addresses after the plurality of data blocks is read from the first memory, and that transfers the first and second data segments contiguously to the host.

2. The storage controller of claim 1 wherein the read plurality of data blocks include data integrity verification data.

3. The storage controller of claim 2 wherein the data integrity verification data is cyclic redundancy code (CRC) data.

4. The storage controller of claim 2 wherein the read assembly module does not transfer the data integrity verification data to the host.

5. The storage controller of claim 1 wherein the read assembly module concatenates the first and second data segments.

6. The storage controller of claim 1 further comprising a second memory, wherein the read assembly module transfers the first and second data segments to the second memory and the second memory transfers the first and second data segments to the host.

7. The storage controller of claim 6 wherein the second memory is a first in first out (FIFO) buffer.

8. The storage controller of claim 1 wherein the first memory is a buffer memory.

9. The storage controller of claim 8 wherein the buffer memory receives the first and second data segments from a storage device.

10. The storage controller of claim 9 wherein the storage device is a hard disk drive (HDD).

11. A storage controller, comprising:
    first memory means for storing a plurality of data blocks that include first and second noncontiguous data segments;
    queue means for storing data lengths and data start addresses of the first and second data segments; and
    read assembly means for communicating with the first memory and the queue module, for receiving a request to read the first and second data segments from a host, for reading the plurality of data blocks from the first memory, for extracting the first and second data segments from the read plurality of data blocks based on the data lengths and data start addresses after the plurality of data blocks is read from the first memory means, and for transferring the first and second data segments contiguously to the host.

12. The storage controller of claim 11 wherein the read plurality of data blocks include data integrity verification data.

13. The storage controller of claim 12 wherein the data integrity verification data is cyclic redundancy code (CRC) data.

14. The storage controller of claim 12 wherein the read assembly means does not transfer the data integrity verification data to the host.

15. The storage controller of claim 11 wherein the read assembly means concatenates the first and second data segments.

16. The storage controller of claim 11 further comprising second memory means for storing data, wherein the read assembly means transfers the first and second data segments to the second memory means and the second memory means transfers the first and second data segments to the host.

17. The storage controller of claim 16 wherein the second memory means is a first in first out (FIFO) buffer.

18. The storage controller of claim 11 wherein the first memory means receives the first and second data segments from a storage device.

19. The storage controller of claim 18 wherein the storage device is a hard disk drive (HDD).

20. A method for operating a storage controller, comprising:

storing a plurality of data blocks that include first and second noncontiguous data segments in a first memory;

storing data lengths and data start addresses of the first and second data segments in a queue module;

receiving a request to read the first and second data segments from a host at a read assembly module;

reading the plurality of data blocks from the first memory;

extracting the first and second data segments from the read plurality of data blocks based on the data lengths and data start addresses after the plurality of data blocks is read from the first memory; and transferring the first and second data segments contiguously to the host.

21. The method of claim 20 wherein the read plurality of data blocks include data integrity verification data.

22. The method of claim 21 wherein the data integrity verification data is cyclic redundancy code (CRC) data.

23. The method of claim 21 wherein the read assembly module does not transfer the data integrity verification data to the host.

24. The method of claim 20 further comprising concatenating the first and second data segments.

25. The method of claim 20 further comprising:

transferring the first and second data segments from the read assembly module to a second memory; and transferring the first and second data segments from the second memory to the host.

26. The method of claim 25 wherein the second memory is a first in first out (FIFO) buffer.

27. The method of claim 20 further comprising receiving the first and second data segments from a storage device.

28. The method of claim 27 wherein the storage device is a hard disk drive (HDD).

* * * * *

UNITED STATES PATENT AND TRADEMARK OFFICE
CERTIFICATE OF CORRECTION

PATENT NO. : 7,287,102 B1  Page 1 of 1
APPLICATION NO. : 10/761786
DATED : October 23, 2007
INVENTOR(S) : Theodore C. White et al.

It is certified that error appears in the above-identified patent and that said Letters Patent is hereby corrected as shown below:

Column 4, Line 16     Delete "loosing" and insert -- losing --
Column 6, Line 7      Delete "mod4" and insert -- MOD4 --

Signed and Sealed this

Fifteenth Day of April, 2008

JON W. DUDAS
*Director of the United States Patent and Trademark Office*